US006927017B2

(12) United States Patent
Jung et al.

(10) Patent No.: US 6,927,017 B2
(45) Date of Patent: Aug. 9, 2005

(54) METHOD FOR FABRICATING REFLECTIVE-TYPE LCD

(75) Inventors: Bong Kwan Jung, Kyoungki-do (KR); Hyun Mook Choi, Kyoungki-do (KR); Ki Yong Kim, Kyoungki-do (KR); Seung Jin Choi, Busan (KR)

(73) Assignee: Boe Hydis Technology Co., Ltd., Kyoungki-do (KR)

( * ) Notice: Subject to any disclaimer, the term of this patent is extended or adjusted under 35 U.S.C. 154(b) by 0 days.

(21) Appl. No.: 10/834,476

(22) Filed: Apr. 29, 2004

(65) Prior Publication Data

US 2005/0142498 A1 Jun. 30, 2005

(30) Foreign Application Priority Data

Dec. 24, 2003 (KR) .................... 10-2003-0096457

(51) Int. Cl.[7] ................................ G02B 5/02
(52) U.S. Cl. .................... 430/321; 430/330
(58) Field of Search ................ 430/321, 330; 349/113, 114

(56) References Cited

U.S. PATENT DOCUMENTS

2004/0001174 A1 * 1/2004 Doi et al. ................... 349/113

FOREIGN PATENT DOCUMENTS

| JP | 11-248909 A | * | 9/1999 |
| JP | 2002-350841 A | * | 12/2002 |
| JP | 2004-037520 A | * | 2/2005 |

* cited by examiner

Primary Examiner—John A. McPherson
(74) Attorney, Agent, or Firm—Ladas & Parry LLP

(57) ABSTRACT

Disclosed is a method for fabricating a reflective-type liquid crystal display device, capable of uniformly forming embossings causing a uniform reflective angle of incident light over the whole area of a substrate. The method includes the steps of coating a negative type organic insulation layer, soft-baking the organic insulation layer, performing a primary exposure process for the organic insulation layer, performing a secondary exposure process by using an exposure mask having openings, and curing the organic insulation layer through a post bake process and performing a thermal process with respect to a non-exposed part of the organic insulation layer, thereby forming embossings. The primary exposure process is carried out by applying an energy less than an optimum energy, and the secondary exposure process is carried out by applying the optimum energy.

2 Claims, 2 Drawing Sheets

METHOD FOR FABRICATING REFLECTIVE-TYPE LCD

BACKGROUND OF THE INVENTION

1. Field of the Invention

The present invention relates to a method for fabricating a reflective-type liquid crystal display (LCD), and more particularly to a method for forming embossings by using outgassing of solvent.

2. Description of the Prior Art

As is generally known in the art, reflective-type liquid crystal display devices do not require backlight, so they are adaptable for portable display devices having low power consumption. As markets of portable phones and portable appliances have been extended, the demand for such reflective-type liquid crystal display devices has been gradually increased.

Since such a reflective-type liquid crystal display device has a light incident path and a light reflective path, the reflective-type liquid crystal display device represents transmittance lower than that of a transmissive type liquid crystal display device having a single light path. In particular, the reflective-type liquid crystal display device represents a low transmittance in a direction of a main viewing angle thereof.

In order to compensate for such a low transmittance, conventional reflective-type liquid crystal devices have reflection plates formed with uneven surfaces. That is, embossings are formed on a lower surface of the reflection plate.

Conventionally, an organic insulation layer is coated on the reflection plate and a half-tone exposure process is carried out with respect to the reflection plate in order to form the embossings on the lower surface of the reflection plate. When the half-tone exposure process is carried out, light having an excessive energy more than an optimum energy (hereinafter, simply referred to as Eop) is applied to a non-embossing area of the reflection plate so that the organic insulation layer coated on the non-embossing area may be completely reacted with the light. In contrast, light having an energy less than the Eop is applied to an embossing area of the reflection plate so that only a predetermined portion of the organic insulation layer may react with the light.

When the embossings are formed on the reflection plate through the half-tone exposure process, a reflective angle of an incident light is adjusted by controlling an amount of the energy applied to the reflection plate. However, the reflective angle of the incident light may significantly vary even if there is little variation of process conditions, thereby restricting a manufacturing process for the reflective-type liquid crystal device.

Particularly, if the reflective angle is unevenly formed over the whole area of a substrate, display quality of the reflective-type liquid crystal display device is deteriorated.

SUMMARY OF THE INVENTION

Accordingly, the present invention has been made to solve the above-mentioned problems occurring in the prior art, and an object of the present invention is to provide a method for fabricating a reflective-type liquid crystal display device, capable of forming embossings generating a uniform reflective angle over the whole area of a substrate.

In order to accomplish this object, there is provided a method for fabricating a reflective-type liquid crystal display device, the method comprising the steps of: coating a negative type organic insulation layer on a glass substrate formed with an under layer including a thin film transistor; soft-baking the organic insulation layer; performing a primary exposure process for the organic insulation layer without using an exposure mask such that a cross linking occurs at an entire surface of the organic insulation layer; performing a secondary exposure process for the organic insulation layer by using an exposure mask having openings such that the cross linking occurs only at an exposed part of the organic insulation layer, which has been subject to the primary exposure process; and curing the organic insulation layer, which has been subject to the primary and secondary exposure processes, through a post bake process and performing a thermal process with respect to a non-exposed part of the organic insulation layer to induce outgassing of solvent existing in the organic insulation layer, thereby forming embossings.

According to the preferred embodiment of the present invention, the primary exposure process for the organic insulation layer is carried out by applying an energy less than an optimum energy, and the secondary exposure process for the organic insulation layer is carried out by applying the optimum energy.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1A:
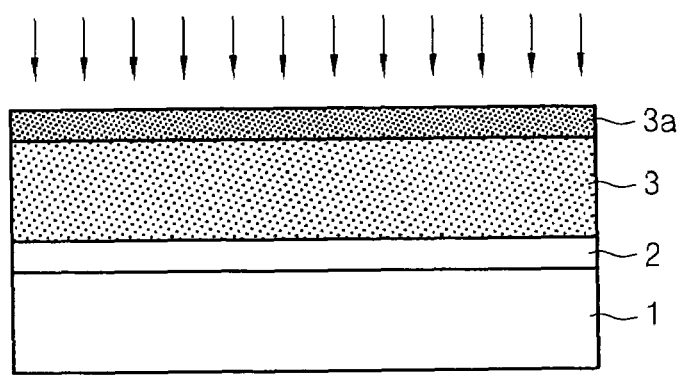
FIGS. 1A to 1C are sectional views showing a fabricating process for a reflective-type liquid crystal display device according to one embodiment of the present invention.

Hereinafter, a preferred embodiment of the present invention will be described with reference to the accompanying drawings. In the following description and drawings, the same reference numerals are used to designate the same or similar components, and so repetition of the description on the same or similar components will be omitted.

According to a technical principle of the present invention, embossings are formed by using gas which is created when removing solvent remaining in an organic insulation layer.

If such embossings are fabricated through a conventional method, in which a reflective angle of incident light is adjusted by controlling an energy during an exposure process and the reflective angle of the incident light may sensitively vary according to variation of process conditions, it is impossible to uniformly adjust the reflective angle of the incident light over the whole area of a substrate. However, if the embossings are fabricated by using outgassing of solvent according to the present invention, the reflective angle of the incident light is not significantly varied even if the process conditions are changed, so it is possible to form the embossings causing a uniform reflective angle over the whole area of the substrate.

Figure 1B:
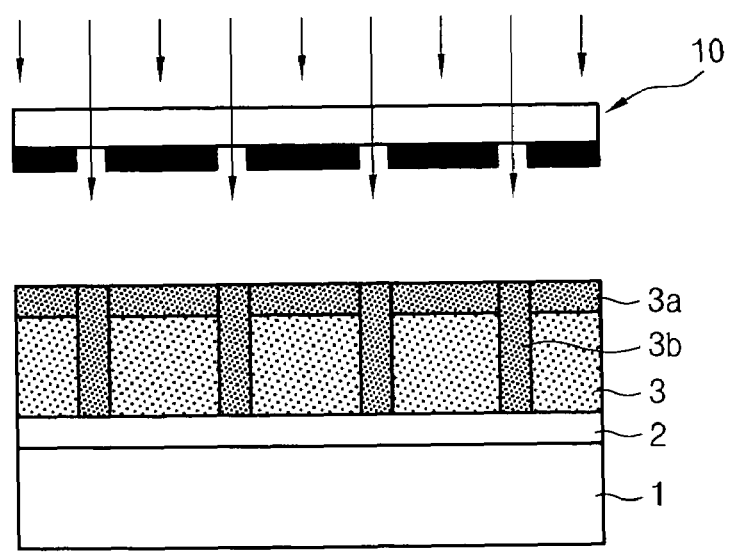
Figure 1C:
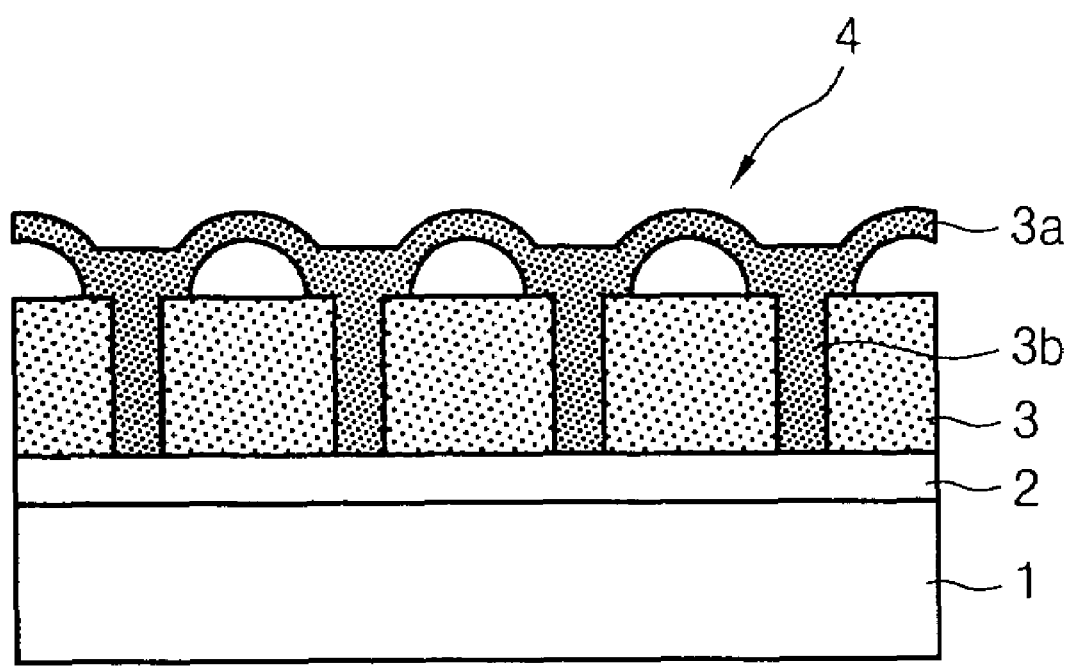

FIG. 1A to 1C are sectional views showing a fabricating process for a reflective-type liquid crystal display device according to one embodiment of the present invention.

Referring to FIG. 1A, an under layer 2 including a thin film transistor is formed on a glass substrate 1 through a well-known process. Then, after coating an organic insulation layer 3 having a thickness of about 2 $\mu$m on an entire surface of the glass substrate 1 such that the under layer 2 is covered with the organic insulation layer 3, a soft-bake process is carried out for the organic insulation layer 3.

After that, a primary exposure process is carried out for the organic insulation layer 3 without using an exposure mask. At this time, the primary exposure process is carried out by applying an energy less than an optimum energy (Eop) in such a manner that a cross linking is created only at a surface of the organic insulation layer 3. Herein, the primary exposure process is necessary to prevent solvent existing in the organic insulation layer 3 from coming out of the organic insulation layer 3 when a next post bake process is carried out. Reference numeral 3a represents a cross linking part of the organic insulation layer 3, which is formed during the primary exposure process.

Referring to FIG. 1B, a secondary exposure process is carried out for the organic insulation layer 3, which has been subject to the primary exposure process, by applying the optimum energy with using an exposure mask 10 having openings defined by a chrome pattern. At this time, a difference of an exposure level occurs at each region of the organic insulation layer 3. Particularly, the cross linking occurs at an exposed part of the organic insulation layer 3. That is, the organic insulation layer 3 is divided into the exposed part and a non-exposed part. Reference numeral 3b represents a cross linking part of the organic insulation layer 3 which is formed during the secondary exposure process.

Referring to FIG. 1C, the post bake process is carried out with respect to the organic insulation layer 3, which has been experienced the primary and secondary exposure processes. When the post bake process is carried out, since solvent component, which has not been removed from the organic insulation layer 3 through the soft bake process, may remain in the organic insulation layer 3, outgassing of the solvent component may occur. Herein, since the exposed part of the organic insulation layer 3 has already been cross-linked, the outgassing of the solvent component may not occur at the exposed part of the organic insulation layer 3. Accordingly, the outgassing of the solvent component may be concentrated on the non-exposed part of the organic insulation layer 3. Since an upper surface of the organic insulation layer 3 has already been cross-linked, the outgassing of the solvent component does not occur at the upper surface of the organic insulation layer 3. As a result, the solvent component does not come out of the organic insulation layer 3, but form voids on the upper surface of the organic insulation layer 3, thereby forming embossings 4 on the upper surface of the organic insulation layer 3.

Herein, such embossings 4 are formed by performing a thermal process with respect to the non-exposed part of the organic insulation layer 3, in such a manner that the embossings 4 are uniformly distributed over the whole area of the glass substrate while causing an uniform reflective angle of incident light.

After that, although it is not illustrated, a reflection plate is formed on the organic insulation layer 3 formed at the upper surface thereof with the embossings 4. Then, an alignment layer is formed on the reflection plate, thereby fabricating a lower substrate. Thereafter, an upper substrate is coupled to the lower substrate by interposing an liquid crystal layer therebetween, thereby fabricating the reflective-type liquid crystal display device of the present invention.

As described above, according to the present invention, the embossings are formed on the upper surface of the substrate through performing primary and secondary exposure processes and the thermal process with respect to the organic insulation layer by utilizing the outgassing of the solvent component, so the reflective angle of the incident angle may be uniformly formed over the whole area of the substrate as compared with the conventional method, in which the embossings are formed by adjusting an energy during the exposure process. Therefore, it is possible to improve transmittance of the reflective-type liquid crystal display device.

In addition, according to the present invention, the reflective angle of the incident light can be easily controlled so that a process margin is ensured.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A method for fabricating a reflective-type liquid crystal display device, the method comprising the steps of:
   i) coating a negative type organic insulation layer on a glass substrate formed with an under layer including a thin film transistor;
   ii) soft-baking the organic insulation layer;
   iii) performing a primary exposure process for the organic insulation layer without using an exposure mask such that a cross linking occurs at an entire surface of the organic insulation layer;
   iv) performing a secondary exposure process for the organic insulation layer by using an exposure mask having openings such that the cross linking occurs only at an exposed part of the organic insulation layer, which has been subject to the primary exposure process; and
   v) curing the organic insulation layer, which has been subject to the primary and secondary exposure processes, through a post bake process and performing a thermal process with respect to a non-exposed part of the organic insulation layer to induce outgassing of solvent existing in the organic insulation layer, thereby forming embossings.

2. The method as claimed in claim 1, wherein the primary exposure process for the organic insulation layer is carried out by applying an energy less than an optimum energy, and the secondary exposure process for the organic insulation layer is carried out by applying the optimum energy.

* * * * *